United States Patent [19]
Delfs et al.

[11] Patent Number: 6,079,436
[45] Date of Patent: Jun. 27, 2000

[54] ENERGY SUPPLY DEVICE FOR A COMPRESSED AIR BRAKE SYSTEM FOR COMMERCIAL VEHICLES

[75] Inventors: Joachim Delfs, Hemmingen; Ruediger Leopold, Weil der Stadt; Claus Seegis, Esslingen, all of Germany

[73] Assignee: Knorr-Bremse, Systeme fur Nutzfahrzeuge GmbH, Munich, Germany

[21] Appl. No.: 09/242,301
[22] PCT Filed: May 7, 1997
[86] PCT No.: PCT/DE97/00917
§ 371 Date: Feb. 12, 1999
§ 102(e) Date: Feb. 12, 1999
[87] PCT Pub. No.: WO98/06614
PCT Pub. Date: Feb. 19, 1998

[30] Foreign Application Priority Data

Aug. 14, 1996 [DE] Germany ............................ 196 32 754

[51] Int. Cl.⁷ ...................................................... B60T 17/02
[52] U.S. Cl. ................................. 137/115.19; 137/115.21; 137/115.25
[58] Field of Search ........................ 137/115.19, 115.21, 137/115.23, 115.25

[56] References Cited

U.S. PATENT DOCUMENTS

| | | |
|---|---|---|
| 2,479,359 | 8/1949 | Holt .................................... 137/115.19 |
| 4,763,959 | 8/1988 | Vandemotter ................................ 303/9 |
| 5,447,174 | 9/1995 | Bourkel et al. ..................... 137/115.19 |

FOREIGN PATENT DOCUMENTS 0119505  9/1984  European Pat. Off. .

OTHER PUBLICATIONS

Abstract of USSR Patent 1527051, Dec. 7, 1989.

*Primary Examiner*—Stephen M. Hepperle
*Attorney, Agent, or Firm*—Ronald E. Greigg; Edwin E. Greigg

[57] ABSTRACT

The energy supply device has a compressor for supplying at least one compressed air consumer. On the outlet end, the compressor communicates with a pneumatically controllable outlet valve. Furthermore, two pressure regulating valves are provided, with which control air can be conveyed to the outlet valve in order to switch the outlet valve into the outlet position. The first pressure regulating valve can be switched by control electronics in accordance with a pressure sensor that detects the pressure on the consumer end. The second pressure regulating valve can be switched directly by the pressure on the consumer end. The second pressure regulating valve switches at a greater pressure on the consumer end than the first pressure regulating valve. In the event of a failure of the control electronics or of the first pressure regulating valve, the second pressure regulating valve takes its place.

2 Claims, 1 Drawing Sheet

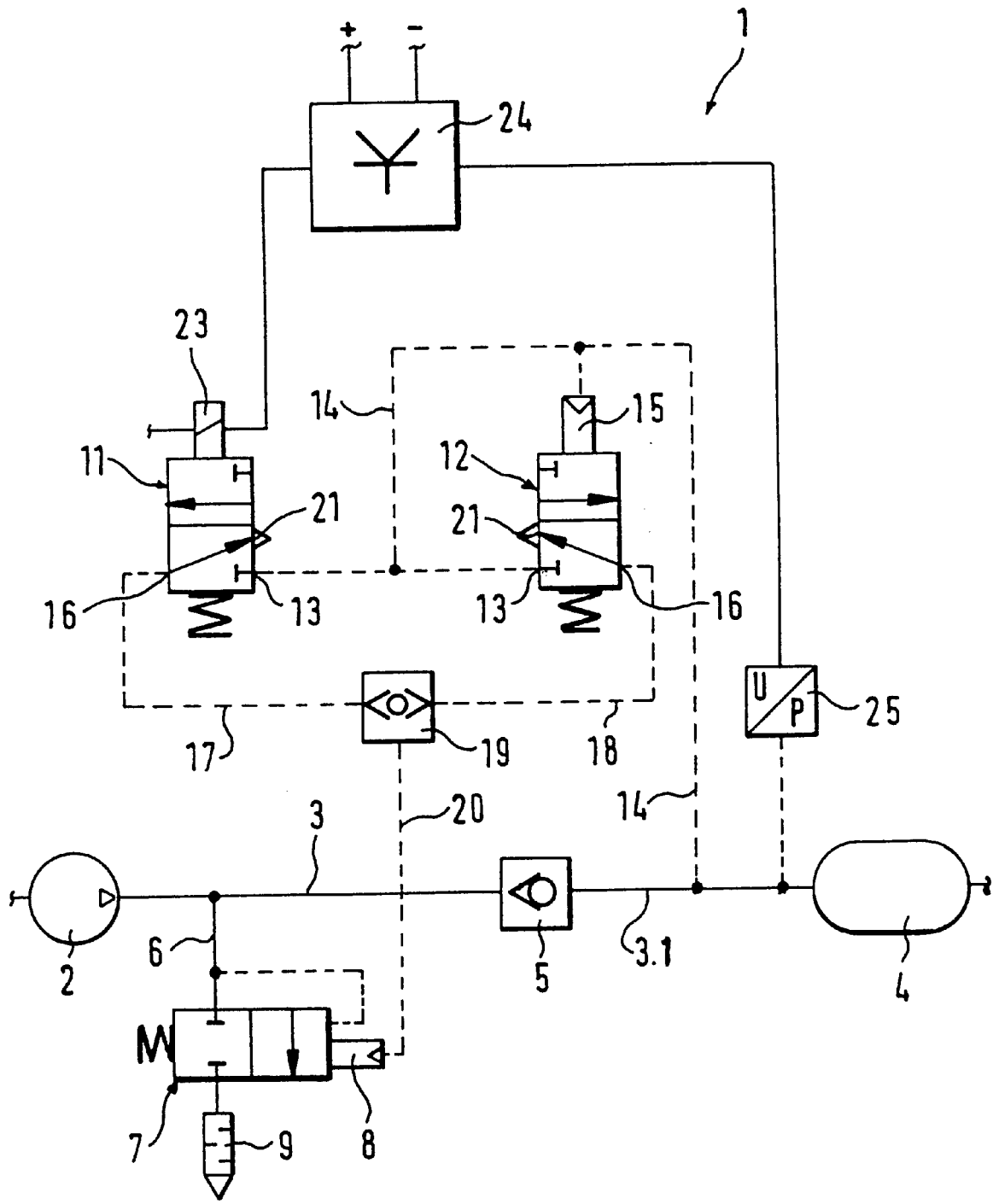

ENERGY SUPPLY DEVICE FOR A COMPRESSED AIR BRAKE SYSTEM FOR COMMERCIAL VEHICLES

PRIOR ART

The invention is based on a energy supply device for a compressed air brake system.

An energy supply device of this kind has already been disclosed (EP 0 689 117 A2), in which the outlet valve (idle valve) has a spring-loaded valve disk, which can be moved into the outlet position by means of a tappet of a piston-like actuation means if the consumer-end pressure level exceeds the previously selected disconnect pressure of the electromagnetically controllable pressure regulating valve and conducts control air to the actuation means of the outlet valve so that this opens abruptly. The closing spring of the outlet valve is dimensioned in such a way that the outlet valve opens independently of the actuation means, even in the event of a failure of the pressure regulating valve, i.e. also functions as a safety valve. However, the (uncontrolled) reaction pressure of the outlet valve is exaggerated relatively markedly in comparison to the disconnect pressure (controlled by the pressure regulating valve). In addition, it is uneconomical if the compressor functions in opposition to the closing spring of the outlet valve in the event of a failure of the pressure regulating valve.

ADVANTAGES OF THE INVENTION

The energy supply device according to the invention, has the advantage over the prior art that in the event of a failure of the electromagnetically controllable pressure regulating valve, the regulation of the pressure is maintained with high quality and in the outlet position of the outlet valve, the compressor can operate at an idle without significant resistance.

A trouble-free guidance of the control air from the respectively operating pressure regulating valve to the outlet valve and vice versa is achieved by means of the measure taken hereinafter.

BRIEF DESCRIPTION OF THE DRAWING

An exemplary embodiment of the invention is explained in more detail in the description below in conjunction with a simplified wiring diagram of an energy supply device for compressed air brake systems.

DESCRIPTION OF THE EXEMPLARY EMBODIMENT

An energy supply device 1 represented in the sole FIGURE is provided for use in a compressed air brake system for commercial vehicles that is otherwise not shown. The device 1 has a compressor 2, from which a supply line 3 leads to a compressed air container 4, to which, for example, a service brake circuit, not shown, of the compressed air brake system is attached as a consumer. A check valve 5 that prevents compressed air from flowing back out of the container 4 is disposed in the supply line 3. Between the compressor 2 and the check valve 5, a line branch 6 is connected to the supply line 3 and leads to an outlet valve (idle valve) 7. The outlet valve 7 is embodied as a 2/2-way valve which assumes its closed position in a spring-actuated fashion. It can be switched abruptly into the outlet position with a pneumatic actuation means 8. Furthermore, the outlet valve 7 can be moved into the outlet position by the pressure of the compressor 2. After the outlet valve 7, the line branch 6 continues on to a noise damper 9.

For the sake of a simple depiction, only the compressed air container 4 of one compressed air consumer is represented in the wiring diagram. The supply line 3, however, can be branched after the check valve 5 to other consumers of the compressed air brake system. The additional consumers can either be connected directly to the branched supply line 3 or can be connected to it with a compressed air container. With a compressed air brake system embodied in this manner, a multiple protection valve is disposed in the supply line 3 after the check valve 5 or an overflow valve is disposed in each of the line branches of the supply line. In addition, in modern compressed air brake systems, an air dryer is disposed in the supply line 3 between the connection of the line branch 6 and the check valve 5. The check valve 5 is then bypassed with switching means for the regeneration of this air dryer.

The energy supply device 1 also has two pressure regulating valves 11 and 12 which are depicted in the wiring diagram as 3/2-way valves. The two pressure regulating valves 11 and 12 have a first connection 13, and by way of a branched line 14, this connection communicates with the supply line 3, in fact with its section 3.1 that runs between the check valve 5 and the compressed air container 4. A pneumatic actuation means of the pressure regulating valve 12 is also connected to the line 14. A control line 17 and 18 respectively leads from a second connection 16 of the two pressure regulating valves 11 and 12 and these control lines lead to a shuttle valve 19 with a return flow. On the outlet end, the shuttle valve 19 is connected with a control line 20 to the pneumatic actuation means 8 of the outlet valve 7. Finally, it should be mentioned that the third connection 21 of the two pressure regulating valves 11 and 12 leads to the atmosphere.

In the depicted spring-actuated rest position of the two pressure regulating valves 11 and 12, their first connection 13 is closed while their second connection 16 communicates with the atmosphere. The pneumatic actuation means 8 of the outlet valve 7 is therefore free of control pressure so that the outlet valve 7 assumes its closed position in a spring-actuated fashion.

The two pressure regulating valves 11 and 12 can be switched into their working position in which their first connection 13 communicates with the second connection 16 and their third connection 21 is closed. As mentioned above, the pressure regulating valve 12 can be switched into the working position by the pneumatic actuation means 15. In contrast, the pressure regulating valve 11 has an electromagnetic actuation means 23, which can be switched by control electronics 24 of the energy supply device 1 or the compressed air brake system. A pressure sensor 25 is connected to the control electronics 24 and communicates with the section 3.1 of the supply line 3 between the check valve 5 and the compressed air container 4. In contrast to the exemplary embodiment, the pressure sensor 25 can be connected to the compressed air container 4 or can be connected to the supply line 3 on the consumer end, after this container.

The pressure regulating valve 11 can be switched into the working position according to the pressure that the pressure sensor 25 detects on the consumer end. By programming the control electronics 24, the disconnect pressure of the pressure regulating valve 11 is preset to a value, for example 12.5 bar, and when this value is exceeded on the consumer end, the control electronics trigger the electromagnetic actuation means 23 of the pressure regulating valve 11. By means of the line 14, control air withdrawn at the consumer end can therefore be conveyed through the control line 17, the shuttle valve 19, and the control line 20 to the pneumatic actuation means 8 of the outlet valve 7 in order to switch into the outlet position. The shuttle valve 19 thus assures that the control air does not flow away to the pressure regulating valve 12 through the control line 18. The pneumatic actuation means 8 abruptly switches the outlet valve 7 over into its outlet position in which compressed air supplied by the compressor 2 furthermore flows through the line branch 6 to the atmosphere.

In contrast, the pressure regulating valve 12 can be switched directly by the pressure on the consumer end. This valve is set to a disconnect pressure that is slightly greater than the disconnect pressure of the pressure regulating valve 11, for example the pressure regulating valve 12 is set at a disconnect pressure of 12.8 bar. If the control electronics 24 or the pressure regulating valve 11 fail, then the pressure regulating valve 12 takes over the pressure regulation of the energy supply device 1. If the pressure on the consumer end exceeds the value of 12.8 bar, then the pressure regulating valve 12 switches into the working position and control air is conveyed to the outlet valve 7 through the control line 18, the shuttle valve 19, and the control line 20. The function of the energy supply device 1 is thus maintained when there is a slightly increased consumer pressure.

The foregoing relates to preferred exemplary embodiments of the invention, it being understood that other variants and embodiments thereof are possible within the spirit and scope of the invention, the latter being defined by the appended claims.

What is claimed is:

1. An energy supply device (1) of a compressed air brake system for commercial vehicles, comprising a compressor (2) for supplying at least one compressed air consumer by means of a supply line (3) a check valve (5) disposed in said supply line (3), a pneumatically controllable outlet valve (7), which is connected to the supply line (3) between the compressor (2) and the check valve (5) and includes an activation means (8), an electromagnetically controllable pressure regulating valve (11), with which control air withdrawn at the consumer end can be conveyed through a control line (17, 20) to the outlet valve (7) in order to switch said outlet valve into an outlet position, a pressure sensor (25) that detects the pressure on the consumer end, and control electronics (24) which control the pressure regulating valve (11) according to the pressure detected, a second pressure regulating valve (12) that can be controlled directly by the pressure on the consumer end, with which control air withdrawn on the consumer end can be conveyed by said second pressure regulating valve (12) through a control line (18, 20) to the outlet valve (7) in order to switch the outlet valve into the outlet position, wherein the second pressure regulating valve (12) switches when there is a pressure on the consumer end that is greater than the switching pressure (disconnect pressure) of the electromagnetically controllable first pressure regulating valve (11).

2. The energy supply device according to claim 1, in which like the first pressure regulating valve, the second pressure regulating valve (12) is embodied as a 3/2-way valve and that the control lines (17, 18) of the first and second pressure regulating valves (11, 12) are routed to a shuttle valve (19) whose outlet end is connected to the actuation means (8) of the outlet valve (7).

* * * * *